United States Patent Office 3,597,511
Patented Aug. 3, 1971

3,597,511
PROCESS FOR MAKING BIS-ALKYLENE PYROPHOSPHATES
Robert S. Olson, Lafayette, Guy H. Harris, Concord, and Robert D. Wilcox, Palo Alto, Calif., assignors to The Dow Chemical Company, Midland, Mich.
No Drawing. Filed Feb. 7, 1968, Ser. No. 703,542
Int. Cl. C07d *105/04;* C08f *45/58;* A01n *9/36*
U.S. Cl. 260—980                                9 Claims

ABSTRACT OF THE DISCLOSURE

Cyclic pyrophosphate compounds, herein referred to as bis-alkylene pyrophosphates, are produced directly by a simple, one-step process whereby phosphorus pentoxide is reacted with 2 molar equivalents of an alkylene oxide. Representative alkylene oxides are ethylene oxide, 1,2-butylene oxide, 2,3-octylene oxide and epihalohydrin. The bis-alkylene pyrophosphates so produced have the general formula

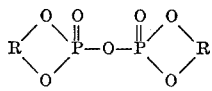

In the above as well as succeeding formulas, R represents a vicinal alkylene or substituted alkylene group. Among other applications, these bis-alkylene pyrophosphates have utility as pesticides and as additives for use in the preparation of flame-resistant polyurethane foams.

BACKGROUND OF THE INVENTION

Certain of the bis-alkylene pyrophosphates have heretofore been prepared by the method described in U.S. Pat. No. 3,159,591. Said method is a two-step process wherein, as the first step, an alkane-1,2-diol is reacted with a phosphoryl halide to form a 2-halo-2-oxo-1,3,2-dioxaphospholane. The reaction takes place as the diol reactant is slowly added to the phosphoryl halide, and at the end of the reaction elaborate precautions are taken to eliminate the hydrogen chloride by-product from the reaction mixture. In the second step of the process, the dioxaphospholane intermediate is reacted either with an anhydrous alkali metal salt of an appropriate caboxylic acid or with water and a base. The resulting bis-alkylene pyrophosphates, which would be called pyro-2-oxo-1,3,2-dioxaphospholanes according to the nomenclature system used in the patent, may then be recovered by a practice of vacuum distillation and other purification techniques.

In contrast to the above method, the present invention is directed to a process wherein bis-alkenyl pyrophosphate compounds are prepared by merely adding the alkylene oxide to the $P_2O_5$ present as a finely divided solid in a suitable liquid reaction medium. The ensuing reaction proceeds at a rapid rate, and is productive of high yields of the desired products.

U.S. Pat. No. 2,568,784 teaches the reaction of $P_2O_5$ with 1-alkylene oxides to form products of indeterminate molecular structure. Hhowever, the alkylene oxide reactant is employed in a ratio of from 3 to 7 moles per mole of $P_2O_5$, a ratio which is much higher than the ratio of approximately 2:1 which is taught herein for the preparation of the bis-alkylene pyrophosphates.

SUMMARY OF THE INVENTION

It has been discovered that bis-alkylene pyrophosphates can be readily and conveniently prepared by the direct reaction of phosphorus pentoxide (herein expressed as $P_2O_5$) with alkylene oxide in an inert liquid reaction medium, the reactants being employed in a ratio of approximately 1 mole of $P_2O_5$ to 2 moles of alkylene oxide. The reaction, which proceeds rapidly at ambient or other relatively low temperatures as the alkylene oxide is added to a suspension of the $P_2O_5$ in the inert liquid, can be represented as follows:

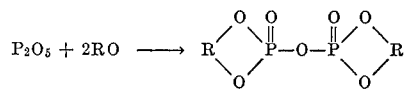

In th above formula, R represents a vicinal alkylene or substituted alkylene group, and each ring of the product compound contains only the 2 vicinal carbon atoms of an RO molecule. Mixed alkylene oxides can be employed, if desired, and thus the R's may represent the same or different alkylene radicals.

Substantially any alkylene oxide can be used in the process of this invention provided it is free of substituents, other than a vicinally attached oxygen atom, which are reactive with $P_2O_5$ at the reaction temperatures employed. Thus, the term "alkylene oxide" as employed herein is intended to include branched or straight chain alkylene oxides wherein vicinal carbon atoms attached to the oxygen atom occupy either the 1,2- or some intermediate position, as well as vicinal cycloalkylene oxides. Representative oxides include the various unsubstituted alkylene oxides of 2 to 20 or more carbon atoms such as ethylene oxide, propylene oxide, 1,2- or 2,3-butylene oxide, 1,2- or 2,3-octylene oxide, cyclohexene oxide, 2,4,4-trimethyl-2,3-pentene oxide, 1,2-dodecylene oxide, and the various 1,2- and other vicinal hexadecylene and octadecylene oxides, as well as mixtures of two or more of said compounds. Also included are any corresponding vicinal mono-olefinic oxides such as butadiene monoxide, for example, as well as the corresponding halo-substituted alkene oxides such, for example, as epichlorohydrin and epibromohydrin. As a practical matter, the preferred reactants are the unsubstituted, saturated, open chain, vicinal alkylene oxides of from 2 to about 20 carbon atoms; these preferred reactant compounds are herein designated, for convenience, as "open chain alkyllene oxides" of the indicated carbon atom content.

The reaction of this invention is conducted in the presence of a liquid reaction medium which is not detrimentally reactive with any component of the reaction mixture at the reaction temperatures employed, and which is free of any water content. Broadly speaking, suitable unreactive liquids of this character include the essentially inert liquids such as hydrocarbons, halohydrocarbon and nitriles. Examples of such liquids are petroleum ether, cyclohexane, benzene, toluene, methylene chloride, chloroform, trichloroethylene, carbon tetrachloride, chlorobenzene, acetonitrile and the like. The reaction medium should be one which is capable of dissolving or otherwise dispersing the alkylene oxide reactant and one in which the bis-alkylene pyrophosphate product has at least limited solubility at the reaction temperatures employed.

The foregoing solubility requirements are best met for ethylene oxide and other lower alkylene oxide reactants by the use of a polar solvent such as taluene, chloroform or acetonitrile, it being noted that the latter compound should be used only at reaction temperatures well below 70° C. since it tends to react with $P_2O_5$ at temperatures above this level. The lower 1,2-alkylene oxides pose the most serious solubility requirements, for if a liquid reaction medium is employed which does not dissolve the bis-alkylene pyrophosphate product as it is formed, the undissolved product tends to coat the unreacted $P_2O_5$ particles, thereby interfering with the reaction. Essentially all the suggested inert solvents can be employed with $C_6$ and higher alkylene oxides.

The amount of inert liquid to employ is not critical, and good results can be obtained by using from ½ or 5 more liters per mole of $P_2O_5$.

The present reaction is conducted at temperatures of from about 0° C. to 100° C. Within this range, it is preferred to employ relatively high temperatures, as from about 45° C. to 75° C. when using the lower (i.e., $C_2$ to about $C_4$) alkylene oxide reactants, and particularly the lower 1,2-alkylene oxides. When using a higher (i.e., $C_4$ or $C_6$ and above) alkylene oxide, temperatures of from about 5° C. to 45° C. are preferred, it having been found that with these oxides the reaction is usually vigorous and exothermic. Cooling is employed when necessary to maintain the reaction temperatures at the desired level.

The present process involves bringing the reactants together in a ratio of approximately 1 mole of $P_2O_5$ to 2 moles of alkylene oxide. However, the same product is obtained when using an alkylene oxide/$P_2O_5$ ratio of somewhat less than 2:1, though the reaction becomes less efficient under these conditions since unreacted $P_2O_5$ will be left in the reaction product. Similarly, a slight excess of the alkylene oxide can also be tolerated, though it may lead to the formation of undesired by-products in some instances. A practical operating range is from about 1.75 to 2.2 moles of alkylene oxide per mole of $P_2O_5$.

The reaction can be carried out using any one of a variety of procedures. In all cases, however, anhydrous reactants should be used, and anhydrous conditions should be maintained both during the reaction as well as when recovering the bis-alkylene pyrophosphate products or storing the same, they being highly reactive with water. Further, the use of a reaction vessel which is resistant to attack by phosphoric acid is recommended. Various plastic or high silica glass equipment items can be employed for small reactors, while in large scale apparatus it is convenient to employ vessels which are lined with a suitably refractory material. It is important that the reaction mixture be stirred during essentially the entire reaction period.

It proves most convenient to first add the $P_2O_5$ to the inert solvent so as to form a suspension of this insoluble reactant in the solvent. The alkylene oxide, either alone or together with additional solvent, is then added to the stirred $P_2O_5$ suspension at a relatively low rate, or in increments, and appropriate heating or cooling means are utilized to maintain the reaction mixture at the desired temperature level. It should be pointed out that adding $P_2O_5$ to undiluted alkylene oxides may be hazardous.

To the end of reducing the occurrence of secondary reactions, especially those wherein the formed bis-alkylene pyrophosphate product in the reaction mixture combines with additional alkylene oxide, the optimum procedure requires the use of a good solvent and, subject to the guidelines set forth above, the use of a temperature which is as high as can be used without inducing temperature run-away on the introduction of alkylene oxide to the $P_2O_5$ suspension, thereby improving the solvent action of the liquid reaction medium. Any excess of alkylene oxide in the system should, of course, also be minimized. With suitable provisions for moisture control, any tendency to form secondary reaction products can also be reduced by employing somewhat less than 2 moles of the alkylene oxide per mole of $P_2O_5$, thus operating at less than 100 percent conversion of the $P_2O_5$. Under these conditions, substantially all the $P_2O_5$ that does react will react with 2 moles of the alkylene oxide to form the desired bis-alkylene oxide product. The unconverted $P_2O_5$ can then be filtered off at the conclusion of the reaction and recycled.

The reaction time is not critical. Under optimum temperature conditions the reaction is essentially complete as soon as all the alkylene oxide has been added or within a period of several hours, thereafter. With relatively lower temperatures, it may be desirable to continue stirring the reaction mixture for a somewhat longer period, such as overnight. In those systems wherein the $P_2O_5$ is not employed in excess, the disappearance of the $P_2O_5$ reactant signals the end of the the reaction.

Once the reaction is completed, the bis-alkylene pyrophosphate product can be recovered by any one of a variety of procedures. The bis-ethylene pyrophosphate and any other bis-alkylene pyrophosphates that exist in the crystalline form can be crystallized out of the reaction mixture, once any excess $P_2O_5$ has been filtered off, by chilling the solution to temperatures somewhat above 0° C., the particular temperature employed being a function of the concentration and the nature of the solvent. The desired product is thus separated from the solvent as well as from any secondary reaction products which may be present. Higher bis-alkylene pyrophosphates, including those formed from $C_6$ and higher alkylene oxides, have only been recovered as oils or waxes. They can be recovered in relatively pure form by first stripping off the solvent and then subjecting the residue to solvent fractionation with solvents adapted to selectively dissolve the desired bis-alkylene pyrophosphate or any by-products which may be present.

DETAILED DESCRIPTION OF THE INVENTION

The practice of the invention is illustrated by the following examples wherein it is to be understood that all reagents employed were free of water, alcohol or any other compound which would react with $P_2O_5$ or other component of the reaction mixture to form acid compounds which interfere with the desired reaction.

EXAMPLE 1

Bis cyclic (1-methyl-2-pentylethylene) ester of pyrophosphoric acid $P_2O_5$ (35.4 g., 0.25 mole) was added to 300 ml. of toluene in a flask equipped with a mechanical stirrer, addition funnel and stoppers as required to provide isolation from the atmosphere. The outside of the flask was cooled with ice water in order to maintain the reaction temperature between 5° C. and 20° C. 2,3-octylene oxide (64 g., 0.5 mole) was then slowly added to the stirred $P_2O_5$ suspension, a small portion at a time. At the end of the addition period, which extended over approximately 1.5 hours, the $P_2O_5$ had substantially disappeared, leaving a pale yellow solution. Once the exothermic reaction ceased, the cooling bath was removed and the solution was allowed to stand overnight, the color then being a yellow brown. The solvent was removed under vacuum, leaving 98.0 g. of product. This product was subjected to both elemental and infrared spectra analysis. Elemental analysis disclosed the product to contain carbon, hydrogen and phosphorus in the amounts of 46.9, 8.0 and 15.2 percent respectively. This compares with theoretical values of 48.25, 8.10 and 15.54 percent for the bis cyclic (1-methyl-2-pentylethylene) ester of pyrophosphoric acid. The infrared spectra disclose the presence of a strong peak at 1320 cm.$^{-1}$ attributable to P=O in a pyrophosphate ring. The other infrared data are commensurate with those of the desired product.

EXAMPLE 2

Bis cyclic (1,1-dimethyl-2-tert.butylethylene) ester of pyrophosphoric acid $P_2O_5$ (248 g., 0.0175 mole) was added to 97 ml. of toluene in a 250 ml. round bottom glass flask equipped with stirrer, thermometer, condenser and dropping funnel. To this was slowly added, with constant stirring, 2,4,4-trimethyl-2- 3-pentene oxide (4.5 g., 0.035 mole), the reaction mixture being cooled to maintain a reaction temperature of 25° C. The temperature was then raised to 48° C., with continued stirring, and maintained for one hour. A sample of the toluene phase was then taken from which the solvent was distilled off under vacuum, the residual product being subjected to infrared spectra analysis. Absorption attributable to P=O in a pyrophosphate ring was found at 1320 cm.$^{-1}$, and the other data were consistent with the structure of bis cyclic (1,1-dimethyl-2-tert.butyl-ethylene) ester of pyrophosphoric acid.

EXAMPLE 3

Bis cyclic (2-hexylethylene) ester of pyrophosphoric acid

This operation was conducted in the same general manner and using the equipment described in Example 2, $P_2O_5$ (1.85 g., 0.013 mole) was added to 100 ml. of dry toluene. To this was slowly added, with stirring, 1,2-octylene oxide (3.33 g., 0.026 mole), the reaction mixture being maintained at a temperature of 35° C. Shortly after all the octylene oxide has been added, the reaction was terminated and the product sampled for infrared analysis. The data so obtained were consistent with the structure of bis cyclic (2-hexyl-ethylene) ester of pyrophophoric acid.

EXAMPLE 4

Cyclic diethylene ester of pyrophosphoric acid $P_2O_5$ (213 g., 1.5 moles) is added to 800 ml. of $CHCl_3$ in a glass flask provided with a stirrer, a thermometer, a Dry Ice condenser and a dropping funnel, all arranged to preclude entrance of water vapor into the reactor vessel. This solution is then maintained under reflux at 62° C. as ethylene oxide (132 g., 3 moles) is slowly added to the stirred solution over the course of several hours. The resulting reaction mixture is then held overnight, in the anhydrous condition, at temperatures of 12° C., thereby inducing the formation of a crystalline product. Elemental and infrared analysis show this product to be the cyclic diethylene ester of pyrophosphoric acid. The crystals have a melting point of 126° C.

EXAMPLE 5

Bis cyclic (2-ethylethylene) ester of pyrophosphoric acid

In the same general manner and with the equipment described in Example 1, $P_2O_5$ (17.7 g., 0.125 mole) was reacted in 300 ml. toluene with 1,2-butylene oxide (18 g., 0.25 mole) was added slowly over the course of 5 hours. The reaction temperature was maintained at a maximum of 33° C. Infrared analysis discloses the product to be rich in bis cyclic (2-ethylene) ester of pyrophosphoric acid.

EXAMPLE 6

Bis cyclic (2-(bromoethyl)-ethylene) ester of pyrophosphoric acid

In the same general manner and with the equipment described in Example 1, $P_2O_5$ (69.1 g., 0.5 mole) was reacted in chloroform with epibromohydrin (100 g., 0.73 mole) added slowly over the course of several hours. The reaction mixture was maintained under reflux conditions during the reaction interval. Infrared analysis of the product disclosed it to contain bis cyclic (2-bromoethyl)-ethylene) ester of pyrophosphoric acid.

EXAMPLE 7

Bis cyclic (1-decylethylene) ester of pyrophosphoric acid

In the same general fashion, and using equipment similar to that described in Example 1, $P_2O_5$ (17.7 g., 0.125 mole) is reacted in 300 ml. of toluene with 1,2-dodecylene oxide (46.1 g., 0.250 mole) added slowly to the $P_2O_5$-containing liquid. The addition was carried out using reaction temperatures between 5° and 21° C. Cooling of the reaction vessel was employed to maintain the relatively low temperatures employed, the reaction being strongly exothermic. At the end of the reaction, a clear very pale solution was obtained. Infrared spectra analysis disclosed that the product consisted in the main of bis cyclic (1-decylethylene) ester of pyrophosphoric acid. A strong peak at 1320 cm.$^{-1}$ was observed.

EXAMPLE 8

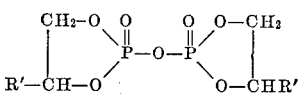

where the R's represent tetradecyl and/or hexadecyl groups.

In the same general fashion, and using equipment similar to that described in Example 1, $P_2O_5$ (5.59 g., 0.0394 mole) was reacted in toluene with 20 g. (0.0788 mole) of mixed oxides containing 40 percent of 1,2-hexadecylene oxide and 60 percent of 1,2-octadecylene oxide. The mixture of oxides was added rather rapidly to the stirred reaction mixture, the addition being complete after a few minutes. The outside of the flask was cooled to prevent the reaction from heating above 20° C. After adding the mixed oxides, the mixture was stirred for a short period and then filtered to remove a small amount of suspended solids. The filtrate was then heated under vacuum using a rotary evaporator to remove the solvent. 20.6 grams of product were recovered and samples thereof were subjected to elemental and infrared analysis. The infrared spectrum was consistent with the anticipated structural formula presented above. Elemental analysis disclosed carbon, hydrogen and phosphorus contents of 54.4, 9.3 and 13.1 percent respectively, as compared with calculated values of 56.46, 9.48 and 12.13 percent.

Many of the bis-alkylene pyrophosphates prepared by the process of this invention are known compounds which are useful for a variety of purposes. In one application, as taught in U.S. Pat. No. 3,159,591, advantage is taken of the flame resistant qualities of these compounds by introducing them into the reaction mixture employed to produce cellular polyurethane foams. Thus, it has been found that when the bis-alkylene pyrophosphate compounds are incorporated into polyether-isocyanate reaction systems and the mixture conventionally foamed by the one-shot, semiprepolymer or prepolymer technique, the polyurethane foams obtained thereby possess a substantial degree of flame resistance. While optimum results are obtained for this useage by first separating the bis-alkylene pyrophosphates from any other reaction by-products formed therewith, the entire product remaining after separating out the solvent can also be used to good effect in many polyether-isocyanate reaction systems.

The products produced by the method of this invention also have numerous agricultural applications. Thus, for example, the products are useful for the control of pests such as the fungi responsible for late blight on potatoes and tomatoes and for apple scab. In representative operations, from 90 to 100 percent control of these diseases can be obtained when the foliage of tomatoes, potatoes or apples is dusted with powders containing 15 percent by weight of the cyclic diethylene ester of pyrophosphoric acid as obtained by methods similar to that presented in Example 4, said dust being applied to the foliage at a rate of approximately one pound per acre.

We claim:

1. A process for preparing bis-alkylene pyrophosphates which comprises reacting $P_2O_5$ with vicinal alkylene oxide in a ratio of 1 mole of $P_2O_5$ to approximately 2 moles of alkylene oxide, said reaction being conducted at temperatures of about 0° C. to 100° C. and in the presence of an inert liquid reaction medium.

2. A process in accordance with claim 1 wherein the $P_2O_5$ is reacted with an open chain alkylene oxide of from 2 to about 20 carbon atoms.

3. A process in accordance with claim 1 wherein the $P_2O_5$ is reacted with a higher open chain alkylene oxide at temperatures of from about 5° C. to 45° C.

4. A process in accordance with claim 1 wherein the $P_2O_5$ is reacted with lower open chain alkylene oxide at temperatures of from about 45° C. to 75° C.

5. A process as in claim 1 which comprises forming a suspension of $P_2O_5$ in an inert liquid reaction medium and then slowly adding to this dispersion, with stirring, at least one alkylene oxide in the proportion of approximately 2 moles of oxide per mole of $P_2O_5$, the reaction mixture being maintained at a temperature of from about 0° C. to 100° C. during the reaction period.

6. A process in accordance with claim 5 wherein the liquid reaction medium is a hydrocarbon, a halohydrocarbon or a nitrile.

7. A process in accordance with claim 5 wherein the liquid reaction medium is toluene, benzene or chloroform.

8. A process in accordance with claim 5 wherein a higher open chain alkylene oxide is added to the $P_2O_5$ dispersion and the reaction mixture is maintained at from about 5° C. to 45° C.

9. A process in accordance with claim 5 wherein lower open chain alkylene oxide is added to the $P_2O_5$ dispersion and the reaction mixture is maintained at from about 45° C. to 75° C.

References Cited
UNITED STATES PATENTS 3,159,591   12/1964   Lanham _____ 260—927X CHARLES B. PARKER, Primary Examiner A. H. SUTTO, Assistant Examiner U.S. Cl. X.R.

260—45.7PS, 927R; 425—209